United States Patent [19]

Yamada et al.

[11] Patent Number: 4,739,424
[45] Date of Patent: Apr. 19, 1988

[54] TAPE CASETTE LOADING AND EJECTING MECHANISM

[75] Inventors: Fumiya Yamada; Seiichiro Matsuki; Masahiko Kawamura; Masashi Kawamoto, all of Saitama, Japan

[73] Assignee: Pioneer Electronic Corporation, Tokyo, Japan

[21] Appl. No.: 775,978

[22] Filed: Sep. 13, 1985

[30] Foreign Application Priority Data

Sep. 14, 1984 [JP] Japan .............. 59-138757[U]
Sep. 20, 1984 [JP] Japan .............. 59-141578[U]

[51] Int. Cl.$^4$ .................. G11B 15/66; G11B 15/675
[52] U.S. Cl. .................. 360/96.5; 360/71; 360/93; 74/89.18; 74/801
[58] Field of Search ........... 360/69, 71, 74.1, 85, 360/90, 93, 95, 96.1, 96.5, 96.6; 242/208, 197–199; 74/89.16, 89.18, 18.19, 801; 192/20, 21; 369/75.2, 77.1, 77.2

[56] References Cited

U.S. PATENT DOCUMENTS

| | | | |
|---|---|---|---|
| 3,882,542 | 5/1975 | Nakamichi | 360/71 |
| 4,295,169 | 10/1981 | Iwata et al. | 360/71 |
| 4,388,658 | 6/1983 | Kajino et al. | 360/85 |
| 4,423,445 | 12/1983 | Okada et al. | 360/96.5 |
| 4,586,096 | 4/1986 | Okada | 360/96.5 |
| 4,592,039 | 5/1986 | Toyoguchi et al. | 369/75.2 |

FOREIGN PATENT DOCUMENTS

| | | | |
|---|---|---|---|
| 56-134345 | 10/1981 | Japan | 360/96.5 |
| 58-97155 | 6/1983 | Japan | 360/96.5 |
| 60-55543 | 3/1985 | Japan | 360/96.6 |
| 60-131667 | 7/1985 | Japan | 360/96.6 |
| 2125608 | 3/1984 | United Kingdom | 360/96.5 |

Primary Examiner—Stuart N. Hecker
Assistant Examiner—Benjamin E. Urcia
Attorney, Agent, or Firm—Sughrue, Mion, Zinn, Macpeak & Seas

[57] ABSTRACT

A cassette tape loading and ejecting mechanism in a tape player for playing back tapes using a driving force of a main motor. The mechanism includes a sun gear provided in part of a mechanism for transmitting the driving force of the main motor. A stationary ring gear is arranged coaxially with the sun gear. A carrier is mounted on a shaft coaxially with the sun gear and is engaged by friction with the sun gear. A planet gear supported by the carrier engages the sun gear and the ring gear. A slot-in type tape cassette holder is driven by the forward and reverse rotation of the carrier for loading and ejecting tape cassettes. The planet gear engages the ring gear when the main gear when the main motor rotates forwardly and the carrier is caused to turn forwardly whereby the planet gear is positioned opposite to an untoothed portion of the ring gear after a tape cassette is loaded and the carrier then stops to allow the playback of the tape continuously. The planet gear again engages the ring gear when the main motor rotates reversely and the carrier turns reversely to cause the tape cassette to be ejected.

5 Claims, 17 Drawing Sheets

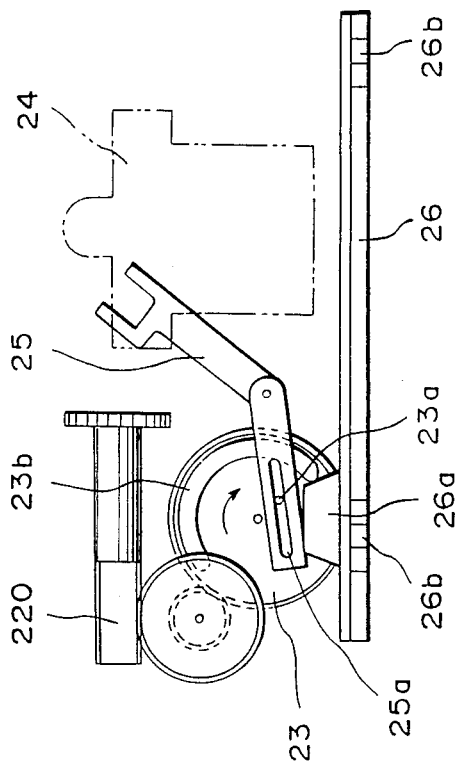

TAPE CASETTE LOADING AND EJECTING MECHANISM

FIELD OF THE INVENTION AND RELATED ART STATEMENT

This invention relates to a tape cassette loading and ejecting mechanism in a compact tape player for use in, for instance, car stereos and portable VTRs.

In a conventional tape player wherein the driving force of one motor is used to load and eject a tape cassette and play back the tape, the untoothed gear mounted along a mechanism for transmitting the driving force has been employed for operation switching. Such a mechanism is designed to place the head in position and to change the direction of the tape. As the main motor is subsequently rotated forwardly, the continuation of the music following the pieces that have been played previously is performed (for instance, from the beginning of the reverse play, provided that the forward play has been given previously). When operating buttons such as MUSIC SEARCH REV, FF, REW, etc are pressed, a first or second submotor will operate and provide desired operation. When a tape has been played back both ways or the eject button is pressed in mid-performance, the main motor will rotate reversely, raising the tape cassette and forcing the tape cassette to eject position, so that the operation is completely stopped.

SUMMARY OF THE INVENTION

According to the present invention, a cassette tape loading and ejecting mechanism in a tape player for playing back tapes using a driving force of a main motor, the mechanism comprises a sun gear provided in part of a mechanism for tansmitting the driving force of the main motor, a stationary ring gear arragned coaxially with the sun gear, a carrier mounted on a shaft coaxially with the sun gear and friction engagement with the sun gear, a planet gear supported by the carrier and engaged with the sun gear and the stationary ring gear, and a slot-in type tape cassette holder driven by the forward and reverse rotation of the carrier for loading and ejecting tape cassettes, means for causing the planet gear to engage the ring gear when the main motor rotates forwardly, the carrier being caused to turn forward, and the planet gear is positioned opposite to an untoothed portion of the ring gear after a tape cassette is loaded, the carrier being stopped to allow the playback of the tape continuously, and the planet gear is made to engage with the ring gear when the main motor rotates reversely, whereby the carrier turns reversely, causing the tape cassette to be ejected, so that the mechanism above has advantages including minimizing impact sound as switching operation is smoothly conducted and making usable a motor having a smaller rated value because no excessively large load is applied to the motor.

According to the present invention, the tape player is arranged so that a tape cassette loading and ejecting mechanism may driven by an idler gear to play position for playing back a tape carried by the cassette, the idler gear being driven by a main motor. Accordingly, it is unnecessary to hook the belt on the main motor for driving the tape cassette loading and ejecting mechanism and moreover only the eccentric force derived from one belt for driving - the tape is applied to the bearing of the main motor; this results in the decreased load applied to the bearing as compared with the conventional device. Moreover, because the reduction gear can be put for common use, a number of reduction gears normally employed for the tape cassette loading and ejecting mechanism may be omitted.

BRIEF DESCRIPTION OF THE DRAWINGS

FIG. 13 is a left side view showing a head forwarding and change-over mechanism used in the embodiment;

DETAILED DESCRIPTION OF THE PREFERRED EMBODIMENTS

Figure 1A:
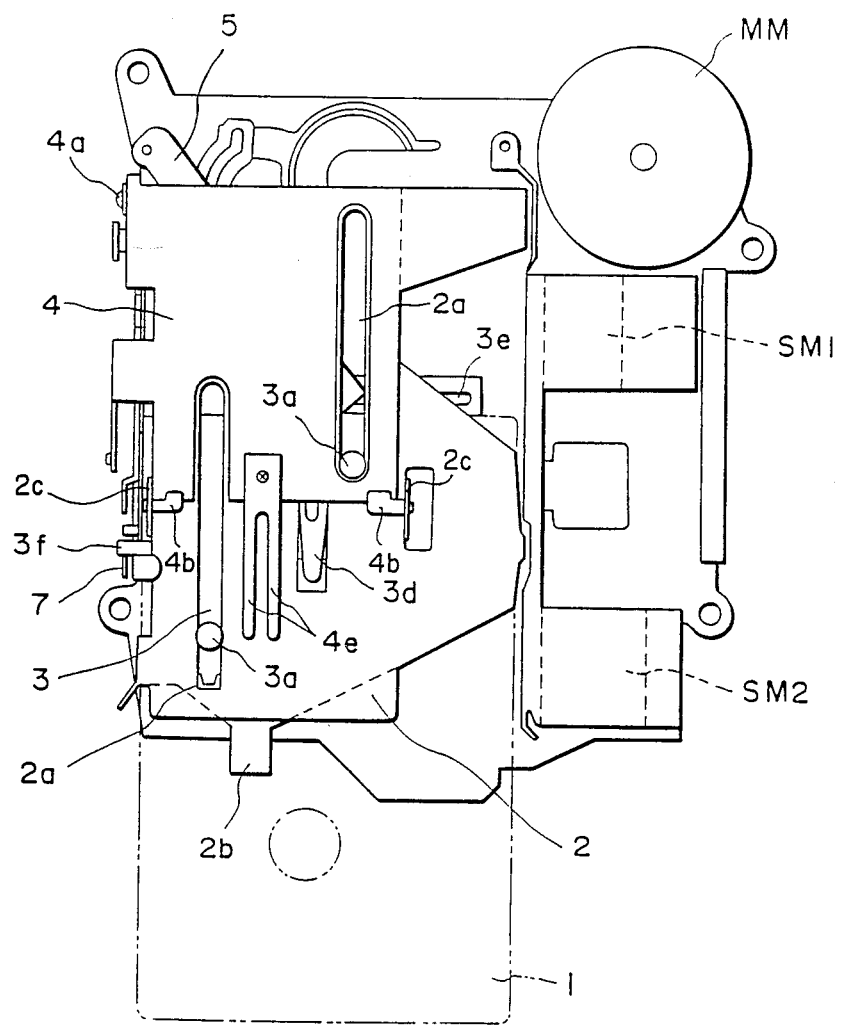
FIGS. 1A and 1B are plan view of a mechanism applied to a car stereo set in accordance with an embodiment of the present invention, FIG. 1A showing a tape cassette inserted state and and FIG. 1B showing a tape cassette retracted state.

Referring now to the drawings, there will be described embodiments of the present invention applied to a car stereo.

Figure 1B:
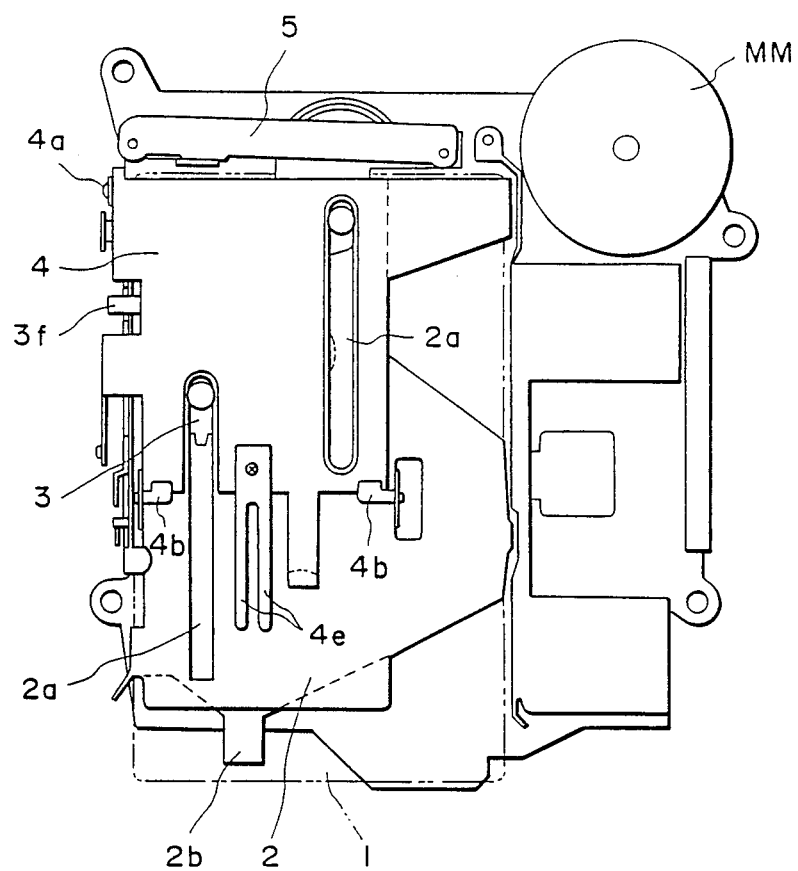

FIGS. 1A and 1B are top views illustrating a car stereo as a whole. FIG. 1A shows a state wherein a tape cassette is being inserted (or ejected). FIG. 1B shows a state wherein the cassette is held in a retracted position.

Figure 2A:
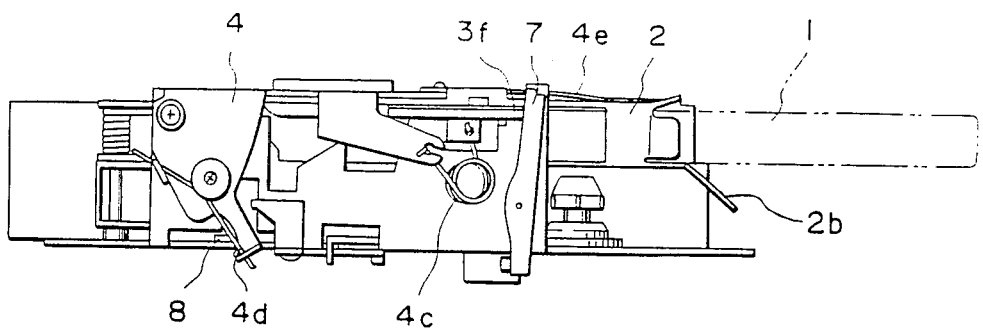
FIGS. 2A, 2B and 2C are left side views of the mechanism shown in FIGS. 1A and 1B, FIGS. 2A, 2B and 2C showing the tape cassette inserted state, the tape cassette retracted state and a play state, respectively.
Figure 2B:
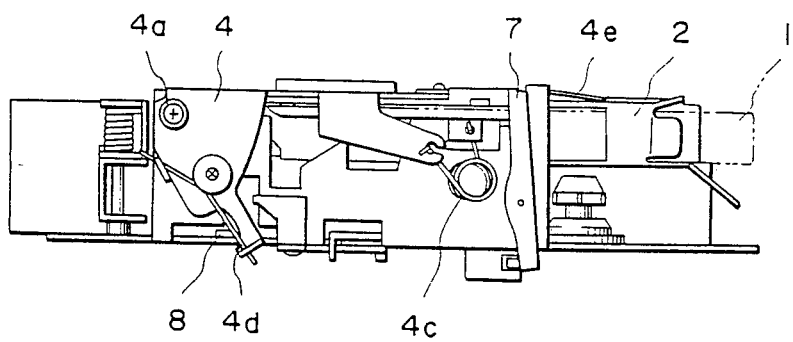
Figure 2C:
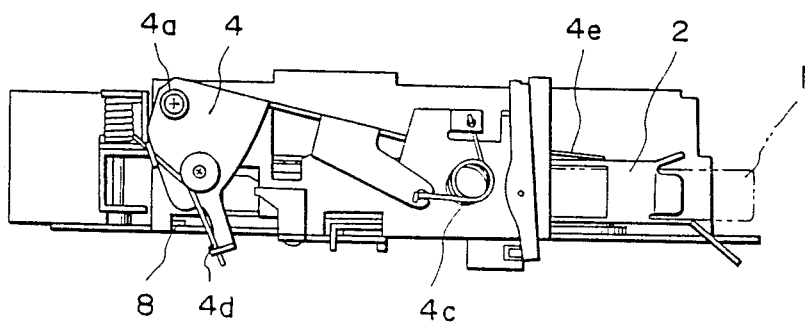

FIGS. 2A to 2C show a left side elevational view of the car stereo shown in FIGS. 1A and 1B. FIGS. 2A and 2B correspond to FIGS. 1A and 1B, and FIG. 2C illustrates a state wherein the tape cassette is lowered to the play position.

The tape player of an automatic reverse type comprises a tape cassette loading and ejecting mechanism, a mechanism for moving a head forwardly and changing the direction thereof, an FF/REW mechanism, a main motor MM for driving the mechanisms, and first and second submotors SM1, SM2.

The construction and operation of those mechanisms will mainly subsequently be described.

[Tape Cassette Loading and Ejecting Mechanism]

The mechanism is equipped with a front inlet (on the lower side in FIG. 1 and righthand side in FIG. 2) where a tape cassette 1 is inserted and discharged therefrom and a holder or cage member 2 for directly supporting the inserted tape cassette 1, the holder 2 being rotatably supported at the foreend of an elevator arm 4.

A cassette sliding member 3 is slidably fitted in a long groove 2a formed in the top plate of the cage member 2 and allowed to move from the position A where the cassette is inserted to the other position B where the cassette is retracted, so that the cassette 1 is inserted and unloaded.

The elevator arm 4 has its base end pivotally supported at 4a by a chassis to lower and raise the holder 2 between the retracted position B and play position C.

A bottom plate of the holder 2 is gradually narrowed in width toward the inlet for the tape cassette and a downwardly slanted projection 2b is provided on the front end thereof. Thus, even if the tape cassette 1 is inserted into the inlet for the tape cassette in a twisted state, it will be guided by the projection 2b and its gradually enlarged portion contiguous thereto, thereby ensuring the insertion of the cassette in the holder 2. As shown in FIGS. 1A and 1B, the projection 2b may be provided closer to the center of the inlet for the tape cassette, or otherwise the projection 2b may be provided at the left or right end of the inlet.

Figure 3:
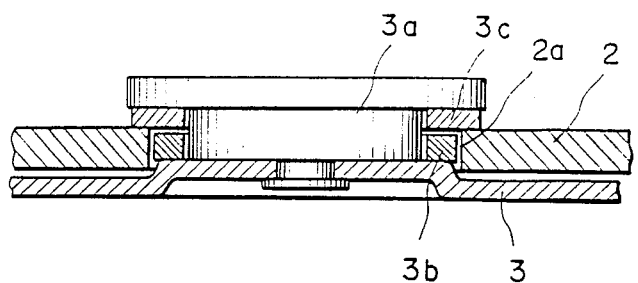
FIG. 3 is a longitudinal sectional view showing a part of a cassette sliding member used in the mechanism of FIGS. 1A and 1B.

As shown in FIG. 3, by a shaft 3a with a flange portion the cassette sliding member 3 is slidably engaged with a long groove 2a formed in the top plate of the holder 2. To prevent friction between the metal components, there are provided a cylindrical metal roller 3b between the shaft portion of the shaft 3a and the wall of the long groove 2a and a plastic annular washer 3c between the flanged portion of the shaft 3 and an outer surface of the holder 2.

Figure 4:
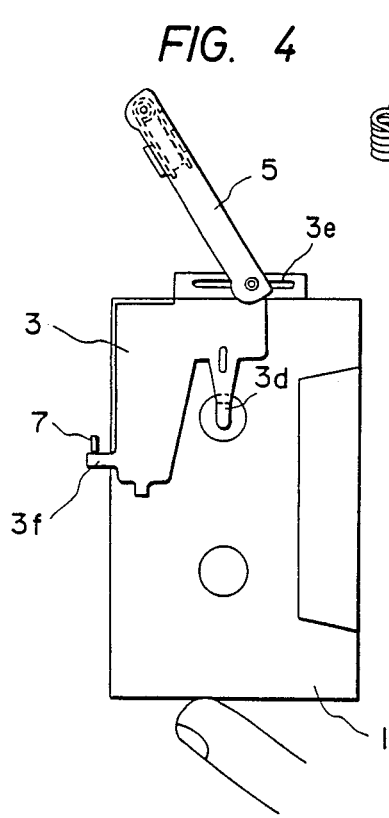
FIG. 4 is a plan view showing the cassette sliding member shown in FIG. 3.

The cassette sliding member 3 is equipped in its central portion with an elastic engagement projecting piece 3d as shown in FIG. 4. The projecting piece 3d is engaged with a reel shaft bore of the tape cassette inserted to support the tape cassette 1 with a small elastic pressure.

A long pin 5a of a swivel lever 5 (FIG. 5) swivelling in the horizontal direction in a slit 3e (FIG. 1) formed at the rear end of the cassette sliding member 3 is engaged with the cassette sliding member 3. The sliding member 3 is moved back and forth by the swivelling of the lever 5 to retract the cassette and to push the cassette outwardly upon the ejection.

Figure 5:
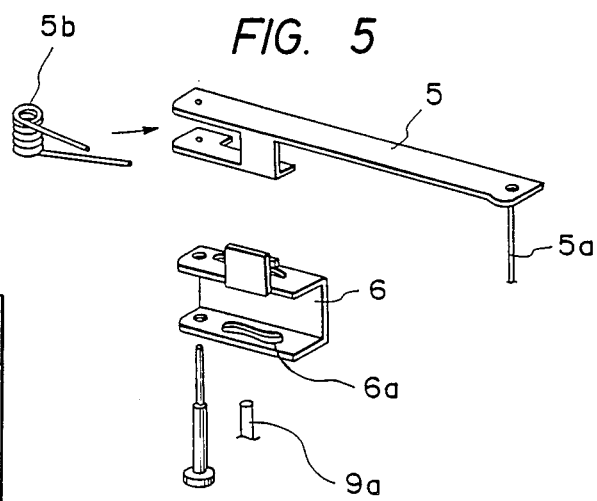
FIG. 5 is an exploded perspective view showing a rotation lever and a cam lever.

As shown in an exploded perspective view of FIG. 5, the lever 5 is coupled to a first cam lever 6 through a torsion spring 5b and, the torsion spring 5b is wound so that only the swivel lever 5 slightly swivels back.

Consequently, as shown in FIG. 4, the torsion spring 5b is wound by the force of insertion caused when the tape cassette 1 is manually inserted into the inlet of the cassette. As a result, the torsion spring 5b causes the cassette sliding member 3 to slightly move back. An operating piece 3f causes a switchlever 7 to swivel and thus the main motor MM to start to rotate.

The torsion spring 5b is relatively roughly wound and its free length is several percent longer than a space, where the torsion spring is to be fixed, at the base end of the swivel lever 5. Thus, the spring is mounted in a compressed state.

In such a construction, the torsion spring 5b is prevented from being displaced. even if the torsion spring 5b contacts its support shaft, the contact force therebetween is weakened. As a result, there is no fear that metal powder would be abraded from the support shaft over a long use and would scatter. This makes it unnecessary to install a spacer between the torsion spring 5b and the support shaft to prevent the former from touching the latter as is often the case with the conventional apparatus.

A driving pin 9a embossed on a carrier 9, FIG. 12A (later described in detail) is fitted in the cam groove or slot 6a of the first cam lever 6 and, when the carrier 9 rotates, the cassette sliding member 3 is caused to move.

Figure 6:
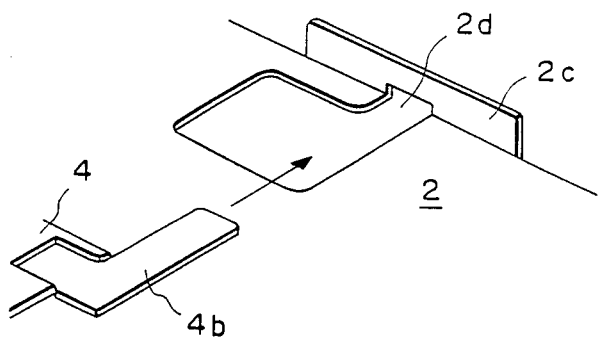
FIG. 6 is a perspective view of a support portion, on the right side, of a holder shown in FIGS. 1A and 1B.

As shown in FIG. 1, upwardly bent portions 2c are formed at the left edge of the holder 2 and at a central portion on the right side of the top plate of the holder 2. An L-shaped groove or slot 2d is formed under the bent portion 2c in the top plate (see FIG. 6).

Figure 7A:
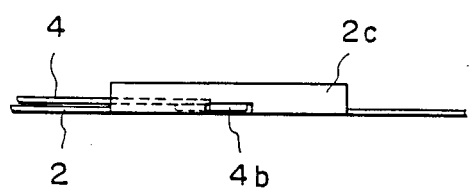
FIGS. 7A and 7B are left side views showing the support portion of the holder shown in FIG. 6.

On both sides of the foreend of the elevator arm 4, there are provided L-shaped extensions 4b with each foreend being directed outwardly. As shown in FIG. 7, each extension 4b is fitted in the groove or slot 2d of the holder 2.

The boss 4b is prepared through the so-called half die cutting method and is held at a level slightly lower than the elevator arm 4. Accordingly, an upper edge of the bent portion 2c is prevented from projecting from the surface of the apparatus and this is effective in minimizing the thickness of the tape player in a car stereo.

Figure 7B:
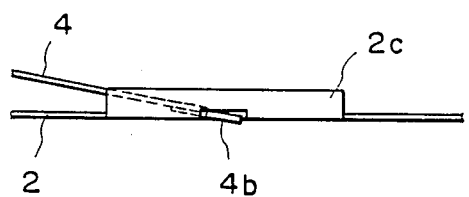

When the elevator arm 4 swivels and reaches the play position as shown in FIG. 7B, the extension 4b will be tilted within the groove or slot 2d. The length of the groove or slot 2d on the lefthand side is made slightly longer than the width of the foreend of the extension 4b on the lefthand side. The holder 2 is driven to the right relative to the elevator arm 4 as viewed from the front side, whereby the extension 4b is prevented from falling apart from the groove or slot 2d.

The assembly of the holder 2 and the elevator arm 4 is quite simple because it only requires steps of allowing the extension 4b on the righthand side to be fitted in the groove or slot 2d and the extension 4b on the left to be fitted in the associated groove or slot 2d and urging the holder 2 to the right.

Figure 8A:
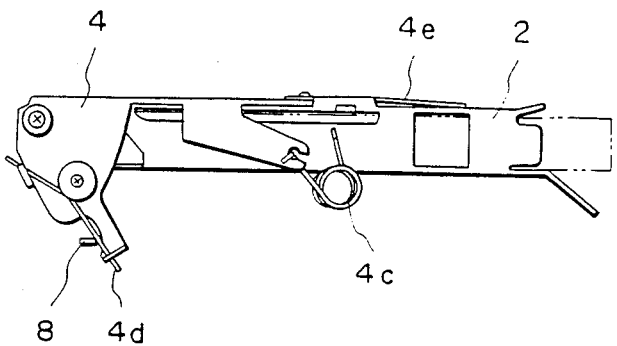
FIGS. 8A and 8B are left side views of the holder retained in the retracted position and the play position, respectively.
Figure 8B:
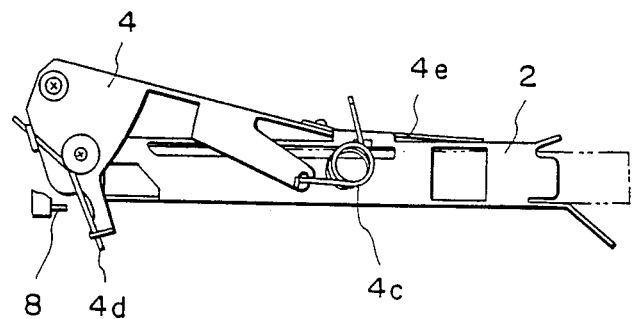

As shown in FIGS. 8A and 8B, there is provided a spring 4c in between the foreend of the elevator arm 4 and the side wall of the chassis. The foreend (that is, the holder 2) of the elevator arm 4 is pressed down relatively strongly at the retracted position (FIG. 8A) and by spring 4c weakly at the play position (FIG. 8B). The elevator arm 4 is relatively made to abut on a second cam lever 8 through the relatively strong spring 4d provided at the base end of elevator arm 4 at the retracted position (FIG. 8A) and hold the holder 2 at the elevated position by means of the force of the spring 4d.

As shown in FIG. 8B, the elevator arm 4 swivels clockwise when the engaged end of the second cam lever 8 moves back, causing the holder 2 to move to the play position, whereby the second cam lever 8 further moves back and separates from the spring 4d.

As shown in FIGS. 1, 2 and 8, a long leaf spring 4e is produced from the foreend of the elevator arm 4 and the foreend is made to abut against the top plate of the holder 2, giving clockwise swivelling force to elevator arm 4 in the states of FIG. 2C and FIG. 8B.

The aforesaid mechanism is intended to prevent the holder 2 from tilting counterclockwise because of its own weight while it moves from the retracted position (FIG. 8A) to the play position (FIG. 8B), because the groove or slot 2d of the holder 2 is located ahead of the position of its center of gravity in the cassette retracted state (owing to the fact that a large amount of swivelling of the elevator arm 4 is not allowed).

Both the first cam lever 6 and the second cam lever 8 are driven by the driving pin 9a implanted in a carrier 9.

Figure 9A:
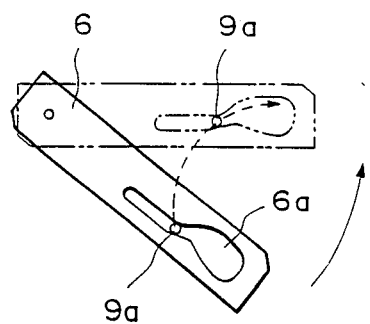
FIGS. 9A and 9B are plan views showing second cam lever and driving pin movements, used in the embodiments respectively.
Figure 9B:
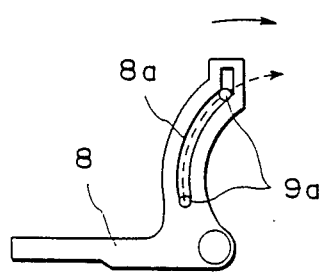

Since the shapes of the cam grooves or slots 6a and 8a are such as those shown in FIGS. 9A and 9B, the first cam lever 6 swivels counterclockwise when the carrier 9 swivels clockwise in the direction indicated by a dotted line and the second cam lever 8 swivels clockwise when the carrier 9 makes the final small swivelling. When the first cam lever 6 swivels, the second cam lever 8 will not swivel whereas when the second cam lever makes the final swivelling, the first cam lever 6 will not swivel. In other words, the cassette sliding member 3 moves back to move the inserted tape cassette 1 to the retracted position first and the elevator arm 4 swivels to lower the tape cassette 1 to the play position.

When the tape cassette 1 is ejected, the carrier 9 swivels reversely and follows a reverse course to discharge the tape cassette.

[Driving Mechanism]

Figure 10:
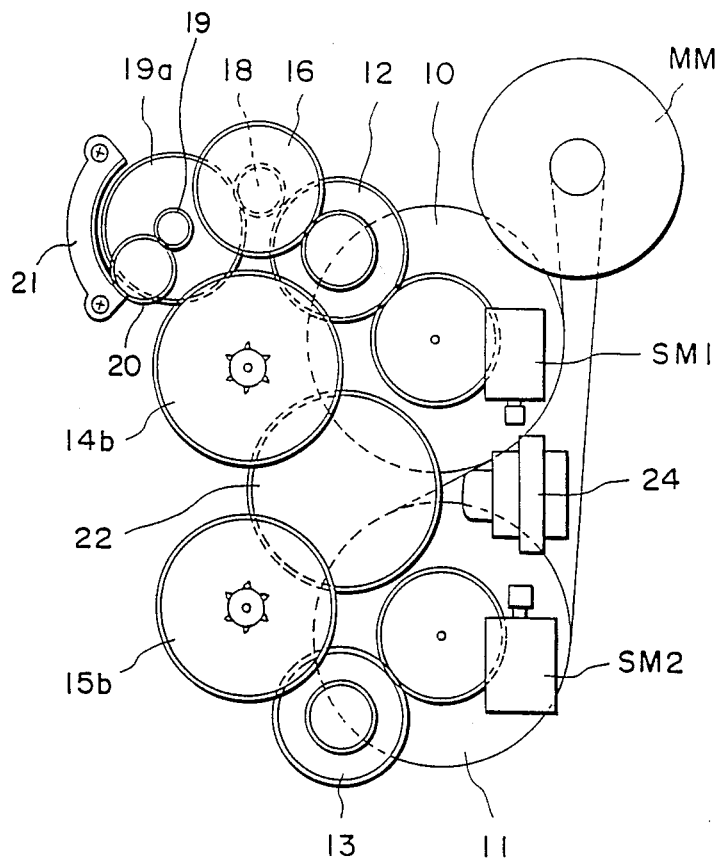
FIG. 10 is a plan view of a driving mechanism for the magnetic head.

FIG. 10 is a schematic diagram of a driving mechanism.

A flywheel 10 on the forward side and the other flywheel 11 on the reverse side are driven by a main motor MM through a main belt and, depending on the direction of the travelling tape, either reel table 14 or 15 is driven to rotate through either play idler gear 12 or 13. A large gear 19a mounted coaxially with a sun gear 19 is driven by the play idler gear 12 on the forward side through gears 16 and 18 equipped with loading torque limiters. A first submotor SM1 is used to move the rotary head forward and switch the pinch roller and the play idler gears. A second submotor SM2 is used to switch an FF/REW idler gear 22.

Figure 11A:
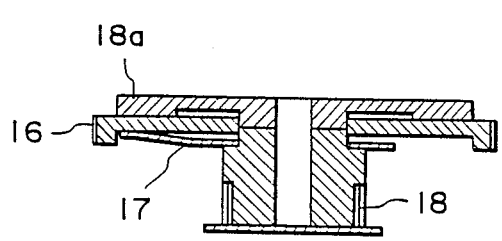
FIGS. 11A and 11B are a vertical cross-sectional view of the loading torque limiter and a plan view of the spring member therefor.
Figure 11B:
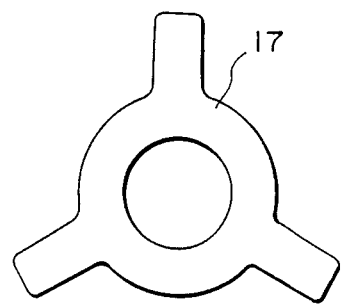

FIGS. 11A, 11B show at a loading torque limiter mechanism. The large diameter gear 16 is supported in between the small diameter gear 18 and a friction disc 18a a predetermined space apart from and coaxially with the gear 18, whereas a curved elastic spring member 17 equipped with three legs shown in FIG. 11(ii) is installed between the gears 16 and 18, whereby the gear 16 is engaged with the friction disc 18a with pressure.

With such a mechanism, the engagement of the large diameter gear 16 with the friction disc 18a is released when the tape cassette loading and ejecting mechanism fails in midway and the upstream driving mechanism is prevented from bearing an excessive load.

Figure 12A:
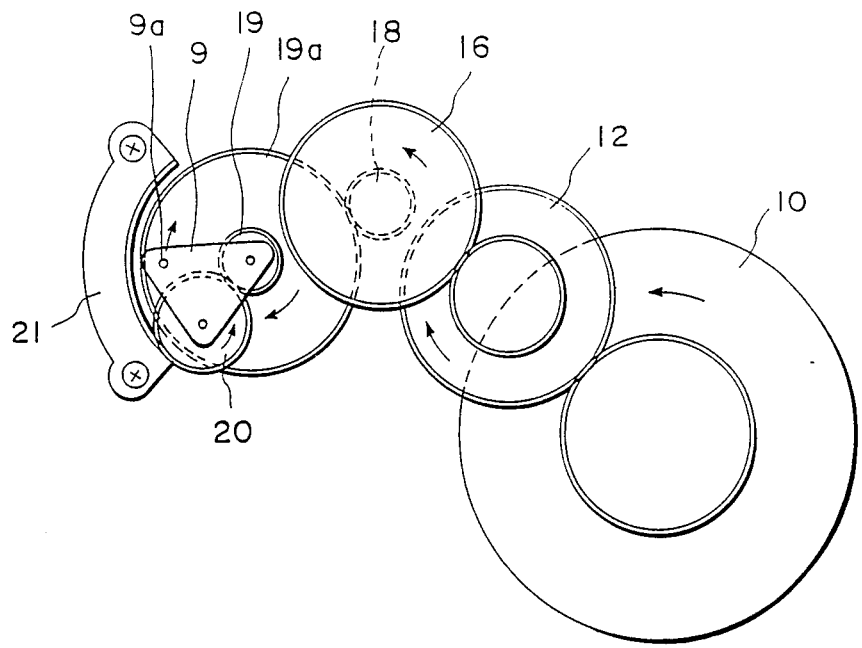
FIGS. 12A, 12B and 12C are plan views showing a planetary gear mechanism used in the embodiment.
Figure 12B:
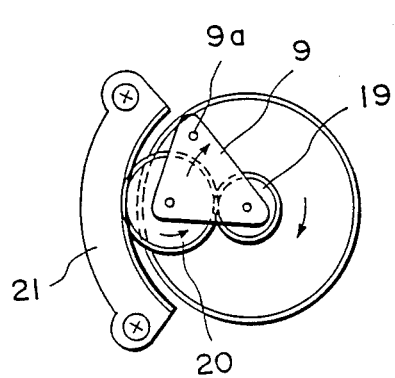
Figure 12C:
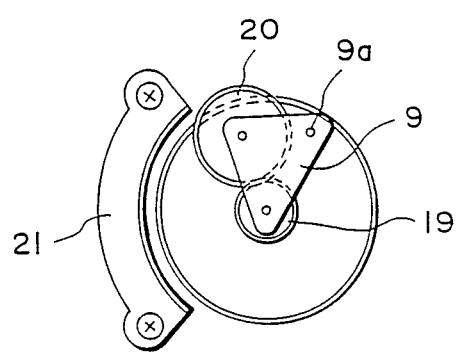

FIGS. 12A, 12B, 12c show a planet gear mechanism for driving the tape cassette loading and ejecting mechanism. A planet gear 20 is engaged with the sun gear 19 fixed coaxially with the large diameter gear 19a and an internally toothed stationary paratial ring gear 21 fixed on the chassis coaxially with the sun gear 19. The planet gear 20 is supported by the carrier 9 mounted pivotally and coaxially with the sun gear 19, whereas the carrier 9 is weakly engaged by friction with the sun gear 19. The driving pin 9a implanted in the carrier 9 is fitted in the cam grooves or slots 6a and 8a of the first cam lever 6 for moving the cassette sliding member 3 and the second cam lever 8 for swivelling the elevator arm 4 (see FIG. 9).

The operation of the mechanism will be described subsequently. When the main motor MM rotates forward FIG. 12A, the sun gear 19 and the planet gear 20 are rotated in the direction of the arrows FIG. 12A and, because the planet gear 20 is engaged with the partial ring gear 21, the carrier 9 is made to swivel clockwise and reach the position of FIG. 12C, whereby the planet gear 20 is disengaged from the ring gear 21 to stop the carrier 9. In the meanwhile, the first and second cam levers 6 and 8 are swiveled to hold in the tape cassette 1 and lower it to the play position. Since the carrier 9 has weakly engaged by friction with the sun gear 19, it is held at the position of FIG. 12C, provided that the main motor MM continues to rotate forwardly.

When the main motor MM is rotated reversely, the carrier 9, together with the sun gear 19, will slightly rotate counterclockwise, causing the planet gear 20 to engage with the ring gear 21, and then the carrier 9 will continue to rotate in the direction opposite to (counterclockwise) that at the time the tape cassette is inserted. The switch lever 7 then rotates to make the main motor MM stop when the carrier 9 has reached the position of FIG. 12C.

[Mechanism for Moving Head Forward and Switching Its Direction]

As shown in FIG. 13, the mechanism for moving the head forward and changing its direction is driven by a cam gear 23 rotated forward and backward by the first submotor SM1 through a worm gear 220. The cam gear 23 is vertically arranged on the righthand side (FIG. 10) of the first submotor SM1 and a pin 23a extending from a side surface of the cam gear 23 is fitted in a long groove or slot 25a provided in one arm of a dogleg arm link 25 for changing the direction of a rotary head 24, whereas the end of a semicircular cam 23b extending from the same side of the cam gear 23 is arranged to abut against the cam crest 26a of a slide lever 26 supported slidably for back and forth movement (in the left and right directions of FIG. 13).

FIG. 13 illustrates a forward play or music search standby state wherein, if the cam gear 23 rotates in the direction of an arrow, the arm 25 for rotating the head will not rotate (practically) and only the slide lever 26 (in FIG. 13) will move to the left, causing the head 24 to move forward and moving the pinch roller and the play idler gear as described later.

Moreover, if the cam gear 23 rotates in the direction opposite to what is shown by the arrow in FIG. 13, the arm 25 for rotating the head will rotate clockwise, causing the rotary head 24 to move reversely first, and the end on the lefthand side of the semicircular cam 23b (in FIG. 13) will be allowed to abut against the lefthand side of the cam crest 26a and move the slide lever 26 to the right.

The position where the cam gear 23 has rotated and the slide lever 26 has moved at the time of play differs from that at the time of music search. Namely, the rotary head 24 at the time of music search is made to stop slightly before the play position.

Figure 14A:
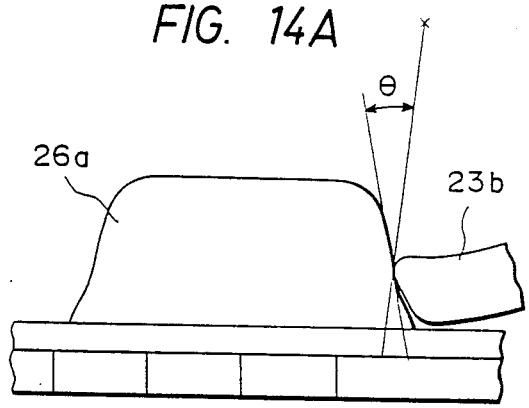
FIGS. 14A and 14B are left side views showing the engagement between a semicircular cam of a cam gear and a cam crest of a slidable lever.
Figure 14B:
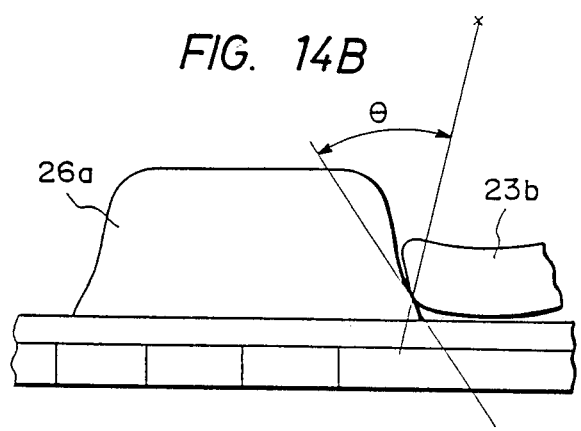

FIGS. 14A and 14B illustrate states wherein the semicircular cam 23b of the cam gear 23 is abutting against the cam crest 26a of the slide lever 26; namely, FIGS. 14A and 14B illustrate such states of music search and play, respectively. In either state, the contact plane where the semicircular cam 23b is in contact with the cam crest 26a is shifted by a certain angle $\theta$ (for instance, $\theta = 20°-50°$) with respect to the direction of a straight line connecting the contact portion and the center of the cam gear 23 to each other.

The reason for that is, as described later, to prevent an error itself in the stop position of the cam gear 23 from being translated to an error in the stop position of the slide lever 26. The stop position of the slide lever 26 is controlled by detecting where the cam gear 23 turns. In other words, such an arrangement is intended to reduce the error in the stop position, whereby accuracy of the stop position of the slide lever 26 can be increased.

Moreover, the position where the semicircular cam 23b abuts against the cam crest 26a upon the music research differs from that upon the play. Consequently an error in the stop position of the slide lever 26 in either position is made adjustable independently.

Figure 15:
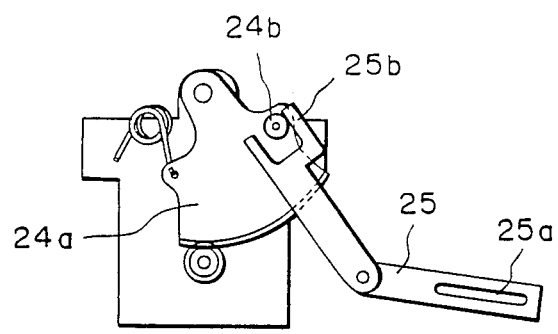
FIG. 15 is a right side view showing the engagement between a head rotating arm and a sector gear.

As shown in FIG. 15, U-shaped engaging means 25b is formed in the other arm of the link 25 for rotating the head 24 (FIG. 15 is a view on the righthand side and the opposite side to FIG. 13). The engaging means 25b is engaged with a boss 24b on a sector gear 24a for turning the rotary head 24 through 180° so that it may be switched from the forward to reverse side and vice versa as the cam gear 23 rotates.

Figure 16:
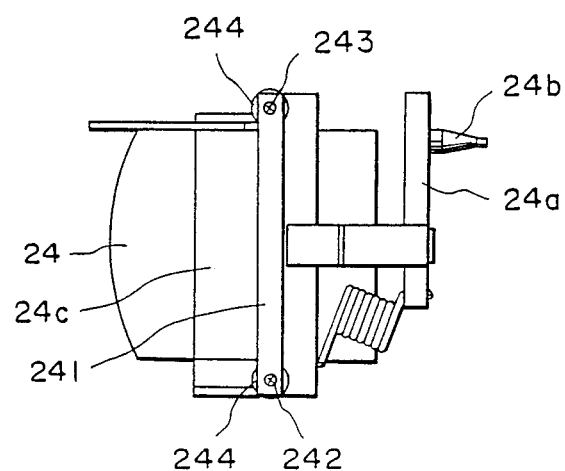
FIG. 16 is a plan view of the rotary head.

As shown in FIG. 16, the boss 24b on the sector gear 24a is equipped at its distal end with a tapered portion and is engaged with the U-shaped engaging means 25b of the link 25 for rotating the head only when the rotary head 24 is located in the release position. The boss 24b is separated from the U-shaped engaging means 25b as the rotary head 24 moves forward further (to the left in FIG. 16) to exhibit a wider space therebetween.

Accordingly, even if the link 25 slightly swivels when the head 24 is moved forward (by rotating the cam gear 23), the rotary head 24 is prevented from arbitrarily swivelling. When the rotary head 24 is switched from the play to release position, moreover, the preventive measure has also the effect of ensuring that the boss 24b engages with the U-shaped engaging means 25b of the link 25.

On the upper side of the rotary head 24, there is provided an azimuth fixing plate 241 formed of a slender elastic member having holes at opposite end, and forward and reverse azimuth screws 242 and 243 are made to pass through the holes, their screw heads being bonded to the azimuth fixing plate 241. The azimuth fixing plate 241 has its central portion abutted against a head stand 24c. Upon azimuth adjustment, the plate 241 prevents azimuth screws 242 and 243 from becoming loose and after the adjustment, serves as a basic plate for bonding the screws. There are provided washers 244 formed of an elastic member, such as rubber and plastics, between the azimuth fixing plate 241 and the head stand 24c. Because of the provision of the washers 244, the azimuth fixing plate may be prepared from a frail or non-elastic member.

Figure 17A:
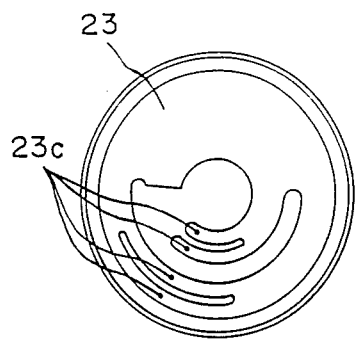
FIG. 17A is a right side view of the cam gear and FIG. 17B is a left side view of a side wall of the chassis confronting the cam gear.
Figure 17B:
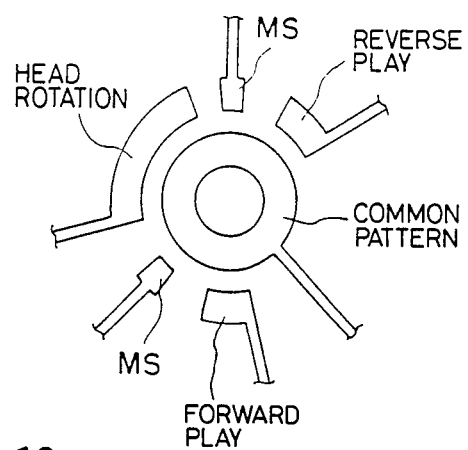

In order to control the position of rotation of the cam gear 23, elastic contact 23c shown in FIG. 17A are provided on the righthand face of the cam gear 23 and are in sliding contact with a metal contact pattern shown in FIG. 17B and formed on the opposing wall of the chassis.

Figure 18:
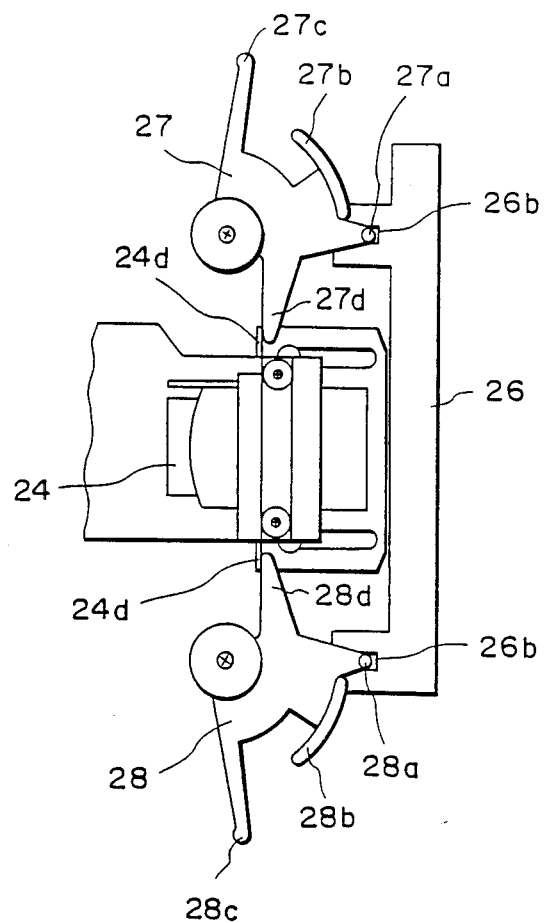
FIG. 18 is a plan view showing a pair of rotation arms and a slidable lever.

As shown in FIG. 18, the slide lever 26 is equipped with recesses 26b for engagement at both ends (on the upper and lower sides in FIG. 18). Pins 27a and 28a of swivel arms 27 and 28, symmetrically provided in front and rear of the rotary head 24, are respectively fitted in the recesses 26b to cause the swivel arms 27 and 28 to swivel.

The swivel arms 27 and 28 are made to swivel synchronously in the same direction: one of which is used to move the head forward and the other to move the pinch rollers and the play idler gears on the forward or reverse side depending on the travel direction of the tape.

Figure 19A:
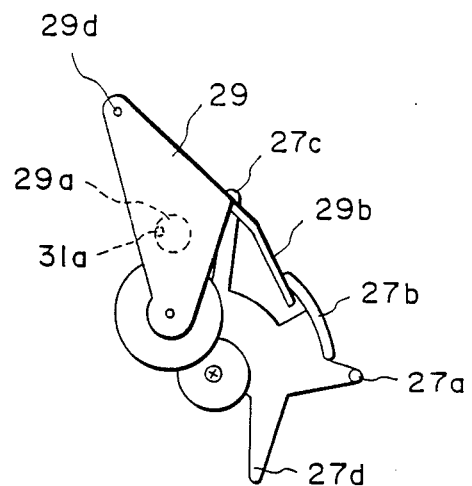
FIGS. 19A and 19B are exploded plan views showing the rear rotation arm in relation to a pinch roller holder and an idler arm, respectively.
Figure 19B:
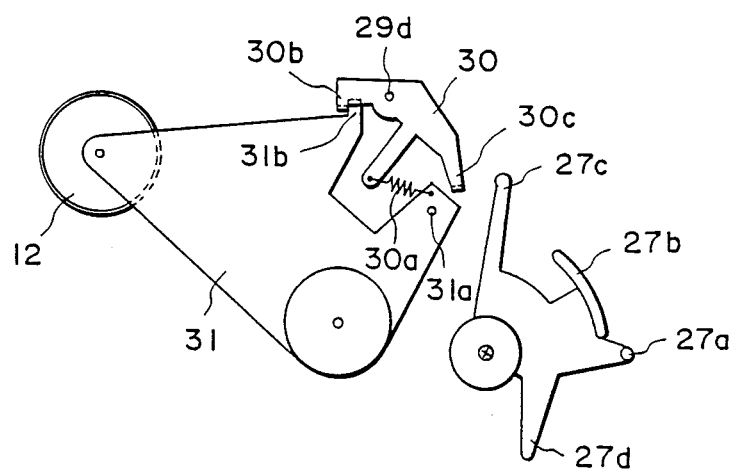

Since the construction and operation of the swivel arms 27, 28 are completely symmetrical relative to the rotary head 24, the explanation will be made as to the rear swivel arm 27. The rear swivel arm 27 consists of, as shown in FIGS. 19A and 19B, curved member 27b abutting against a pinch spring 29b of a pinch roller holder 29, an arm 27c abutting against the contact 30c of a lock arm 30 and an arm 27d abutting against the hold piece 24d of the head stand 24c, FIG. 18. The pinch holder 29 is normally urged counterclockwise by a spring (not shown) mounted on a support shaft 29d. Moreover, a pin 31a extending from an idler arm 31 is loosely insered into a through hole 29a provided in a plate member under the pinch holder 29.

The lock arm 30 and an idler arm 31 are arranged under the pinch roller holder 29. The lock arm 30 and the pinch roller holder 29 are coaxially supported by a shaft 29d on the chassis, the lock arm 30 being equipped with a spring 30a for urging the idler arm 31 counterclockwise and holding means 30b for holding the idler arm 31 at the release position.

The idler arm 31 in the state of FIG. 19B has a hook 31b held by the holding means 30b of the lock arm 30 and is located at the release position, whereas its pin 31a is made to abut against the left end of the through hole 29a of the pinch roller holder 29.

The operation in the case of the forward play will be described. The slide lever 26 is moved back (upward in FIG. 18) to make the swivel arm 27 swivel counterclockwise and the pinch roller holder 29 is caused to swivel counterclockwise by the curved member 27b. As result, the pinch roller is attached under pressure to the forward side of the capstan. Subsequently, the contact 30c of the lock arm 30 is pushed by the arm 27c and swivelled clockwise. The holding means 30b is released from the hook 31b to allow the idler arm 31 to swivel counterclockwise (by the force of the spring 30a) and the play idler gear 23 to engage with the reel gear 14b.

At this time, the front swivel arm 28 is also synchronously swivelled counterclockwise and its arm 28d is made to abut on the holding piece 24d of the head stand and move the head stand 24c to the play position.

When the play state is changed to the release state, the slide lever 26 moves downward, FIG. 18 causing the swivel arm 27 to swivel clockwise. The idler arm 31 will remain at the play position even if the lock arm 30 swivels counterclockwise, because the idler arm 30 is energized by the spring 30a. When the pinch roller holder 29 is swivelled counterclockwise, the pinch roller separates from the capstan and the pin 31a of the idler arm 31 is pressed against the left end of the through hole 29a of the pinch roller holder 29, whereby the idler arm 31 swivels clockwise FIG. 19A. Then, the play idler gear 12 separates from the reel gear 14b. The hook 31b of the idler arm 31 is held by the holding means 30b of the lock arm 30.

The timing the pinch roller is operated is shifted from the timing of operation of the play idler gear. Consequently, the tape is prevented from shifting at the time the release state is transferred to the play position, whereby the head of a piece of music is free from being out of tune. Moreover, tape slackening can be compensated for when the play state is transferred to the release state.

In the reverse play mode, the swivel arms 27 and 28 are made to swivel in the direction opposite to that in the case of the forward play and replace their roles with each other.

In the music search mode, the amount of movement of the slide lever 26 is slightly smaller and the rotary head 24 stops at a position slightly before the play position, so that the pinch roll and the play idler will not reach operating positions.

Figure 20:
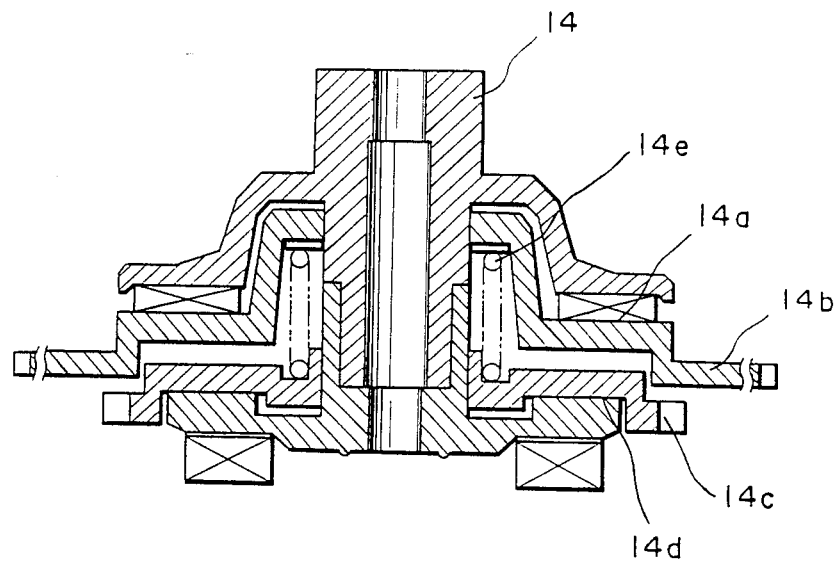
FIG. 20 is a sectional view of a torque changing-over mechanism.

FIG. 20 is a cross sectional view of a torque switching mechanism provided under the reel stand 14 (and 15).

Annular friction faces 14a and 14d with felt material and artificial leather are formed on the surface opposite to two discs coaxially mounted on the reel stand 14, whereas the large and small diameter reel gears 14b and 14c prepared from polyacetal are rotatably supported therebetween.

The coil spring 14e is provided in between the large and small diameter reel gears 14b, 14c and used to press the two reel gears against the upper and lower friction faces so as to obtain a proper friction coeffcient (for instance, $\mu=0.18$ and $\mu=10.49$), respectively. The large diameter reel gear 14b is used for play, whereas the small diameter one 14c for FF/REW. The same friction coefficient may be obtained by using an inorganic polyacetal additive in place of artificial leather as the annular friction face 14d.

Figure 21:
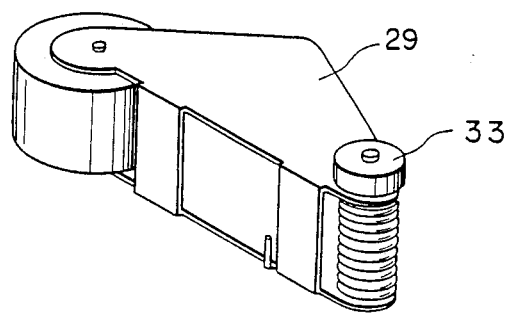
FIG. 21 is a perspective view of a guide roller.

As shown in FIG. 21, a guide roller 33 having an outer diameter slightly larger than that of the shaft is rotatably mounted on the upper end of the shaft supporting a pinch roller holder 29 on this side and, when a tape cassette is inserted, it will be guided by the guide roller 33 and smoothly inserted into the cage member 2.

FF/REW Mechanism

Figure 22:
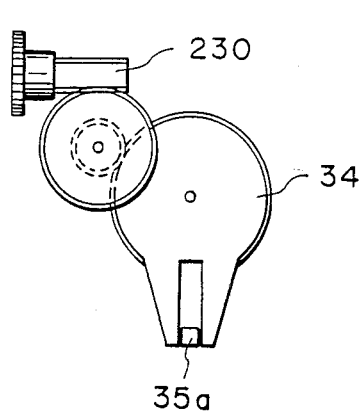
FIG. 22 is a left side view showing an FF/REW driving mechanism.
Figure 23:
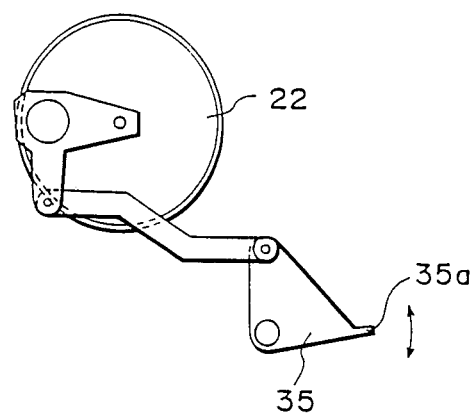
FIG. 23 is a plan view showing the change-over operation of an FF/REW gear.

As shown in FIGS. 22 and 23, the FF/REW operation is implemented through steps comprising rotating a switching gear 34 arranged perpendicularly on the righthand of the second submotor SM2 through a worm gear 230 to swivel an L-shaped arm 35 and engaging the FF/REW gear 22 between the forward side fly wheel 10 and the reel gear 14c or between the reverse side fly wheel 11 and the reel gear 15c.

The elastic contact point and the metal pattern shown in FIGS. 17A and 17B are also provided on the right-hand face of the switching gear 34 and the chassis wall opposite thereto, whereby they are made to slide thereon to allow the production of a detection signal for controlling the rotational position of the switching gear 34.

Figure 26:
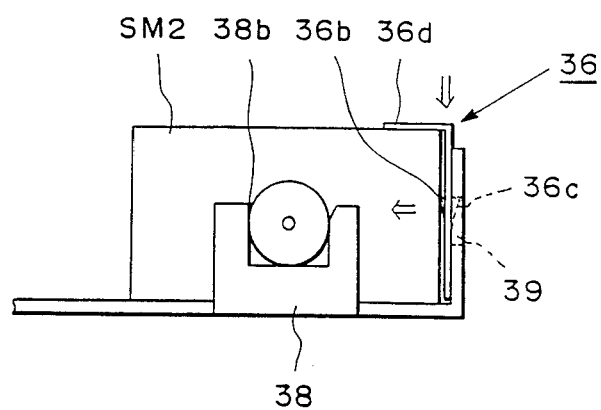
FIG. 26 is a side view showing a state where the second submotor is mounted in place.
Figure 24:
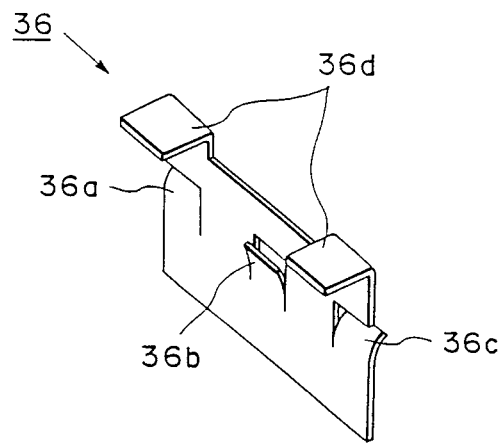
FIG. 24 is a perspective view of a resilient auxiliary plate.

The second submotor SM2 FIG. 26, is installed at the corner where the top plate and vertical wall of the chassis intersects using one auxiliary elastic plate 36 but without using fastening means such as screws. As shown in FIG. 24, the auxiliary elastic plate 36 consists of a flat plate having cut-bent portions 36a, 36b, 36c alternately extending in different directions and two bends 36d continuously connected to the former.

Figure 25:
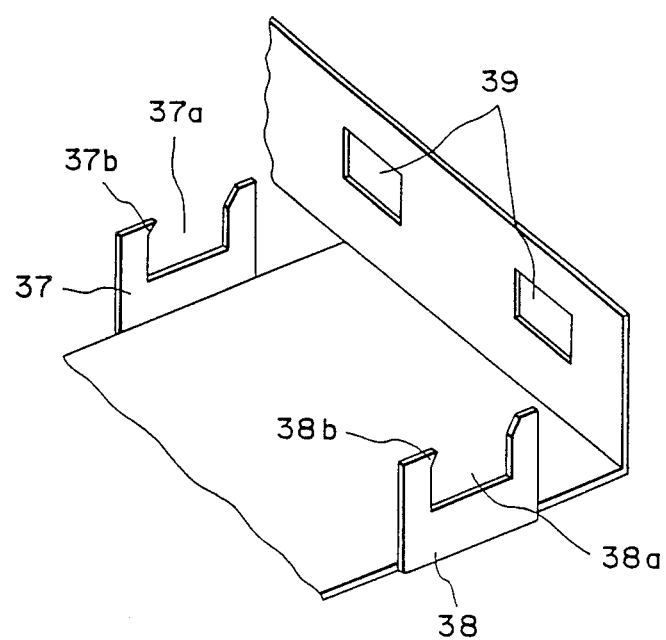
FIG. 25 is a perspective view of a mounting portion for a second submotor.

The top plate of the chassis is supplied with, as shown in FIG. 25 (shown upside down for clarification), bent pieces 37, 38 having U-shaped grooves or slots 37a, 38a into which the fore and rear ends of the bearing of the submotor SM2 are fitted. There are formed claws 37b, 38b, respectively, extending toward the vertical side wall at the upper ends of the U-shaped grooves 37a, 38a on the opposite sides of the vertical wall.

There are also formed two engagement holes 39 in the vertical wall, the bends 36a and 36c of the auxiliary elastic plate 36 being fitted in the engagement holes 39.

FIG. 26 shows a state wherein the aforesaid parts are fitted in. The fore and rear ends of the bearing of the second submotor SM2 are fitted in the U-shaped grooves 37a and 38a. When the auxiliary elastic plate 36 is inserted with pressure from the top in FIG. 26 into the space between the submotor SM2 and the vertical wall, the bends 36a and 36c are fitted in the engagement holes 39 of the vertical wall. The bend 36b extending from the vertical wall in the opposite direction serves to press the submotor SM2 in the direction indicated by an arrow. Consequently, the submotor SM2 is firmly held by the two bends 36d of the auxiliary elastic plate and the claws 37b and 38b of the U-shaped grooves.

Although the submotor SM2 will be prevented from slipping off even though the claws 37b and 38b of the U-shaped shaped grooves are not provided, the presence of such claws will help the submotor firmly fixed.

When it is needed to remove the submotor SM2, the bends 36a and 36c of the auxiliary elstic plate are pushed strongly by using, for instance, a screwdriver to release them from the engagement holes 39. Then the submotor SM2 can readily be removed if the auxiliary elastic plate 36 is pulled out.

The fitting mechanism is applicable to what employs walls or holding means as the bottom and four sides of a case and what can be fitted and removed from the upside only.

[Operation]

The operation of the mechanism as a whole will be described briefly.

When the tape cassette 1 is inserted from the fore side, the switch lever 7 is pushed thereby and the main motor MM is started to hold in the tape cassette and lower it to the play position. Subsequently, the first submotor SM1 operates to move the head forward to cause the switching of its direction. The main motor then continues to rotate forward and allow the performance of pieces of music followed by what has been given previously (for instance, from the beginning of the reverse play, provided that the forward play has been completed previously).

When operating buttons such as MUSIC SEARCH, REV, FF, REW, etc. are depressed, the first or second submotor will operate and provide desired operation.

When a tape has been played back both ways or the eject button is depressed on mid way, the main motor will rotate reversely, raising and forcing and forcing the tape cassette from play position, FIG. 2C to raised retracted position, FIG. 2B, and then to cassette ejected position, FIG. 2A, so that the operation is completely stopped.

We claim:

1. A cassette tape loading and ejecting mechanism in a tape player for playing back tapes, said tape player having a chassis, a main motor, within said chassis said mechanism comprising a sun gear operatively connected to said main motor for transmitting the driving force of the main motor, a stationary, partial ring gear arranged coaxially with said sun gear and having an untoothed portion, a carrier pivotably mounted on a shaft coaxial with the sun gear and in friction engagement with the sun gear, to be driven thereby, a planet gear mounted for rotation about its axis on said carrier and peripherally engaged with said sun gear and said ring gear, and a cassette holder for loading and ejecting tape cassettes, an elevator arm, means for supporting said cassette holder within said chassis, said cassette holder having a top plate, a cassette sliding member fitted in a groove in said top plate for movement between a projected position for cassette insertion and a retracted position, means for pivotably supporting said elevator arm on said chassis for pivoting between a raised and lowered position to shift said holder between said retracted position and a tape play position lowered therefrom on said chassis, and means carried by said carrier and operatively engaging said cassette sliding member for causing said holder to slide relative to said top plate and for pivoting said elevator arm to effect loading and ejection of said tape cassette such that said planet gear is caused to engage with said ring gear when the main motor rotates forwardly with said carrier rotated in a first direction and said planet gear being positioned opposite to said untoothed portion of said ring gear after the tape cassette is loaded and moved to play position within said holder, whereby the carrier is stopped to allow continuous playback of the tape carried by said tape cassette and wherein said planet gear is caused to again engage with said ring gear when said main motor is reversely rotated to pivot said carrier in a reverse, second direction such that reverse direction pivoting of said carrier causes the tape cassette to be ejected.

2. The cassette tape loading and ejecting mechanism as claimed in claim 1 wherein, a swivel lever is pivotably mounted for rotation about a vertical axis on a support proximate to said cassette sliding member, a first cam lever is operatively coupled to said swivel lever, a driving pin fixed to said carrier operatively engages said first cam lever to cause said swivel lever to pivot about its axis, and wherein, a pin fixed to said swivel lever, engages an elongated slot within said cassette sliding member to effect movement of said cassette sliding member whereby the oscillation of the swiveling lever causes retraction of the cassette supported by said holder and pushing of the cassette outwardly of the holder upon ejection.

3. The cassette tape loading and ejecting mechanism as claimed in claim 2 wherein, a support shaft fixed to said chassis commonly pivots said first cam lever and said swivel lever, a torsion spring is carried by said support shaft and engages said swivel lever and said first cam lever and is maintained under compression so as to normally effect angular rotation of the swivel lever relative to said first cam lever, and wherein the torsion spring is wound by the force of cassette insertion when the tape cassette is manually inserted into said cassette holder and wherein said mechanism further comprises an operating piece integral with said cassette sliding member contactable with a switch lever for energizing said main motor and effecting rotation of the main motor to cause said holder and said cassette to be shifted from projected position to retracted position and thence to tape play position in sequence during operation of the main motor in said first direction.

4. The cassette tape loading and ejecting position as mechanism as claimed in claim 3 wherein, said cassette sliding member comprises an elongated slot, said swivel lever carries a long pin fixed thereto and projecting within said elongated slot such that swiveling of said swivel lever causes said cassette sliding member to oscillate between said cassette holder projected and retracted positions.

5. A cassette tape loading and ejecting mechanism as claimed in claim 2 wherein, said elevator arm includes a fore end in contact with said cassette holder, a spring is engaged at one end with said chassis and at an opposite end with said elevator arm fore end tending to bias the fore end of said elevator arm to drive said cassette holder towards play position, and wherein, a second cam lever operatively engages said elevator arm tending to strongly bias said elevator arm towards cassette holder retracted position and elevated from said cassette play position, such that retraction of said second cam lever from engagement with said elevator arm, causes the cassette holder to move from the retracted position to the play position, and wherein said first and second cam levers include cam slots, and wherein said driving pin commonly engages respective cam slots of said first and second cam lever and wherein, said cam slots of said first and second levers are positioned such that, said first cam lever pivots initially during initial rotation of the carrier and the second cam lever pivots during final pivoting of said carrier after termination of the pivoting of said first cam lever whereby, the cassette sliding member moves the inserted cassette and said holder from projected position to retracted position while subsequently the elevator arm pivots to cause lowering of the tape cassette and holder to the play position.

* * * * *